P. G. HUBERT.
FIRELESS COOKER.
APPLICATION FILED NOV. 8, 1907.

920,329.

Patented May 4, 1909.
2 SHEETS—SHEET 1.

Witnesses:

Inventor:
Philip G. Hubert,
By Howard S. Strauss
Attorneys

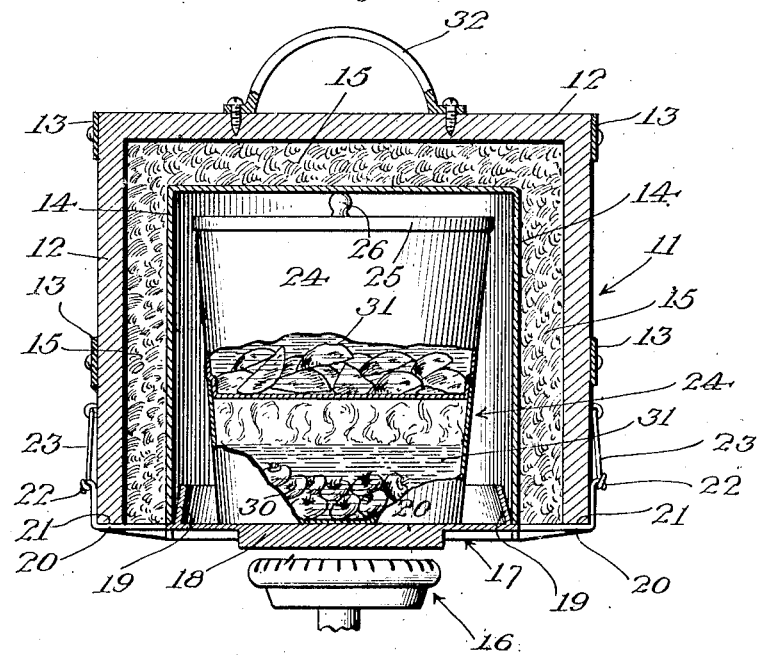
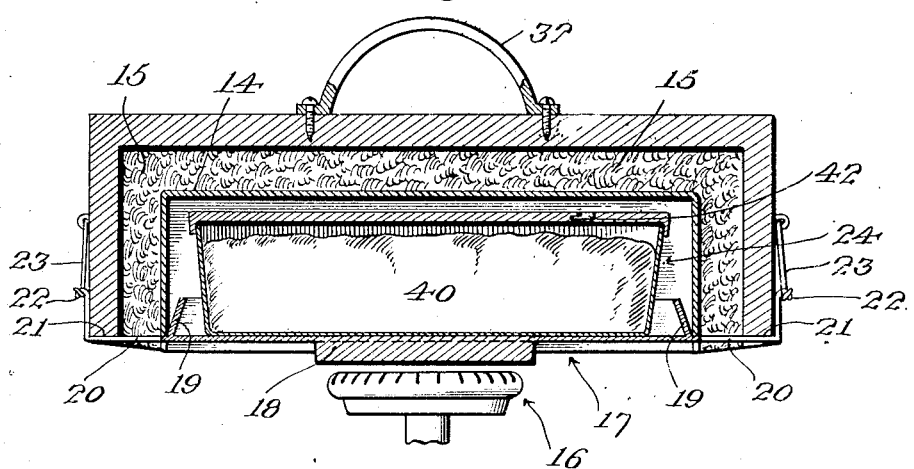

UNITED STATES PATENT OFFICE.

PHILIP G. HUBERT, OF LOS ANGELES, CALIFORNIA.

FIRELESS COOKER.

No. 920,329.　　　Specification of Letters Patent.　　　Patented May 4, 1909.

Application filed November 8, 1907.　Serial No. 401,199.

*To all whom it may concern:*

Be it known that I, PHILIP G. HUBERT, a citizen of the United States, residing at Los Angeles, in the county of Los Angeles and State of California, have invented new and useful Improvements in Fireless Cookers, of which the following is a specification.

My invention relates to a fireless cooker in which articles to be cooked may be placed and heated and allowed to remain for a long period of time without becoming cooled.

The chief object is to provide a cooker in which the articles to be cooked may be initially heated and then removed from the fire while still in the cooker, the articles remaining in the cooker until thoroughly done and thus obviating the necessity of placing the heated articles in a cold receptacle as is the usual operation.

A further object is to provide suitable means within the cooker for cooking or browning the tops of such articles as puddings, bread and the like.

I accomplish these objects by means of the device described herein and illustrated in the accompanying drawings, in which:—

Figure 1:
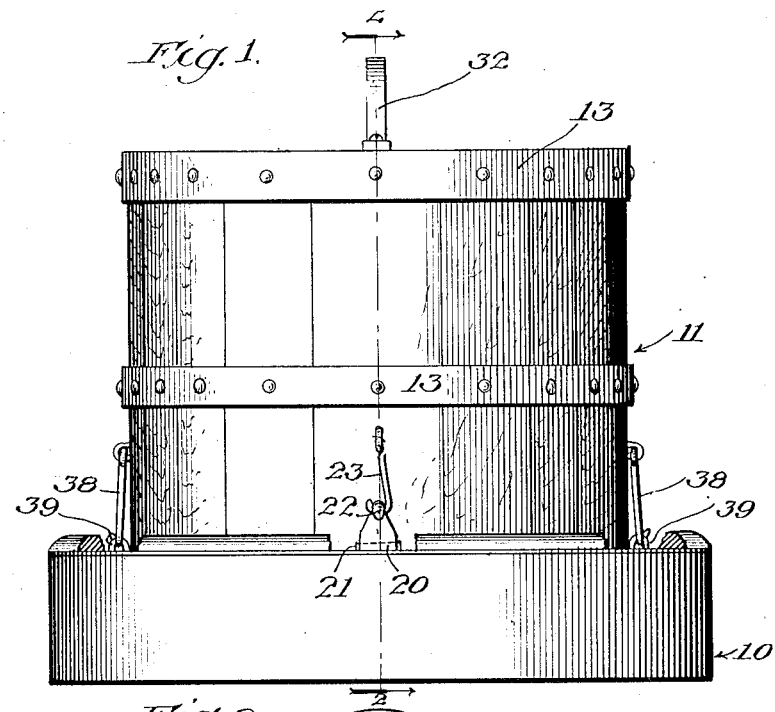
Figure 2:
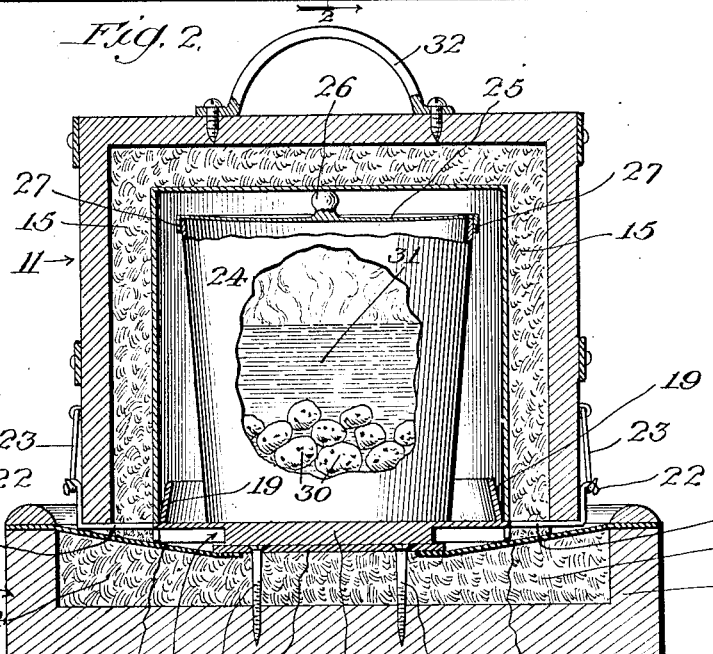

Figure 1,—is an elevation of my cooker as it appears when off the fire. Fig. 2,—is a central vertical section of the same taken on line 2—2 of Fig. 1. Fig. 3,—is a central vertical section similar to Fig. 2, showing the cooker when on the fire. Fig. 4,—is a view similar to Fig. 3 of a modified form of cooker for the purposes of baking.

Referring to the drawings my improved cooker is illustrated as being primarily composed of a base 10 and an inverted cup shaped cover 11 which forms the body portion of the cooker, both cover and base being suitably insulated so as to retain the heat of any article placed therein. Cover 11 may consist of a wooden or thin metal outer casing 12 which may be constructed as shown in the drawings of a number of segments secured together by means of hoops 13 after the manner of construction of a barrel or tub.

Within casing 12 and spaced therefrom at a suitable distance is an inner lining 14 which is preferably made of metal and enameled with a white enamel on its inner surface, although any plain metal such as copper or iron may be used. The space between the outer casing and the inner lining is packed with a non-heat conducting material 15 such as mineral wool.

Referring most particularly to Fig. 3, which illustrates the cooker in position on a fire, 16 designates an oil or gas burner of typical construction over which the cooker is placed while the articles therein are heated. A bottom heating base 17 which fits into cover 11 is adapted to be placed directly above the flame, this heating base having an enlarged or thickened heat conducting portion 18 at its center directly over the flame. The circular edge of base 17 is turned up to form a conical wedge 19 which is of such a diameter that it will wedge tightly into the bottom opening of the cover as shown in Figs. 2 and 3. Base 17 is provided with a plurality of radially extending ears or tabs 20 which project outwardly through slots 21 in the lower edge of cover 11 and are then turned upwardly and bent to form hooks 22. Mounted on the side of cover 11 are a corresponding plurality of catch hooks 23 which are adapted to engage with hooks 22 and lock the heating base and the cover tightly together.

Cooking receptacle 24 is adapted to be placed within the cooker upon base 17 as shown in Figs. 2 and 3. This receptacle may be made of any suitable material but I preferably employ a receptacle constructed of white enameled metal. A lid 25 whose sectional construction is shown in Fig. 2 is also made of metal and is provided in the center of its upper face with a knob 26 adapted to contact with the top of the inner lining of cover 11, the relative heights of the different parts being arranged so that lid 25 will be held tightly on receptacle 24 when heating base 17 is securely in position in the bottom of the cover. The lid is flanged as at 27 to fit tightly around the upper edge of receptacle 24 so as to hold therein the vapors generated.

In Fig. 3 I have illustrated a modified form of receptacle which consists of two separate pans, one above the other. When only one pan is desired to be used the lower one may be utilized and covered by the upper pan as a lid.

In the use of my improved cooker the articles to be cooked are placed within receptacle 24 as at 30, being covered with water 31 as desired. The receptacle is then placed on heating base 17 and cover 11 is placed over the receptacle and forced down on base 17 until hooks 22 and 23 may engage with each other and hold the cover and base securely together. The whole is then lifted by means of a handle 32 secured to the top, or sides if convenient, of outer casing 12 and placed upon a stove over burner 16. The cooker and the articles therein are heated thereby through base 17 until a suitable temperature has been reached within the receptacle, or in the most usual case, until water 31 has begun to thoroughly boil. The cooker is then taken from the stove and placed on insulated base 10, being allowed to remain on the base until the articles therein are thoroughly cooked.

Base 10 is constructed with an outer casing 33 which may be of wood as illustrated or of sheet metal of suitable thickness. This casing is cup shaped and contains a heat insulating material 34 which may be mineral wool or similar substance. The center of this material is depressed by a plate of metal 35 which is held down by means of screws 36 so that a space is afforded for thickened portion 18 of base 17. The portions of material 34 surrounding plate 35 are faced by a sheet of asbestos paper 37 upon which base 17 and cover 11 rest. The asbestos paper keeps the insulating material from becoming soiled or displaced and may be easily replaced when necessary.

Cover 11 may be provided, if necessary with a plurality of catch hooks 38, similar to hooks 23, which engage with eyelets 39 mounted on base 10, thus firmly securing the cover and base together, but the weight of the cover will generally be found sufficient.

In Fig. 4 I have illustrated a modified form of cooker which may be square, rectangular or oval in plan and which is especially adapted for baking purposes. To facilitate the baking of articles placed therein, such as bread 40 as illustrated, I have provided a lid 41 which is somewhat similar in construction to lid 25. Lid 41 is thicker than lid 25, being about the usual thickness of a cook stove plate. A lifter hole 42 is provided to facilitate the handling of the lid as this lid is designed to be heated before being placed in the cooker so that the top of the bread may be cooked or browned by the heat radiating thereupon from the lid.

From the foregoing description it will be noted that I have provided a cooker in which articles to be cooked may be placed and heated and allowed to remain until thoroughly done. This method of procedure has a great advantage over methods formerly employed in that the heated articles do not have to be placed in a cold cooker after having been taken from the fire. In using my cooker it is heated to the same temperature to which the articles therein are heated, so that none of the heat from the articles to be cooked is transferred to the cooker and thus lost, so far as the cooking of the articles is concerned.

The prime feature of this invention will thus be seen to involve a heat insulated cover in combination with a heating base of heat conducting material and an insulating base upon which the whole is placed when thoroughly heated.

By the construction of the receptacle and the cooker I am enabled to efficiently retain the vapors generated within the same. This is accomplished by means of the lid upon the interior receptacle and also by means of the formation and placement of the joint between the cover and the base of the cooker. This joint is made at the bottom of the cooker so that the hotter part of the vapors which accumulate at the top will not escape should any leakage take place. A joint of sufficient size and insulation of sufficient thickness may be used to insure the retention of the heat within the cooker for a sufficient length of time to thoroughly cook any article of food.

The metal parts of my cooker may be made of any suitable material, but I preferably employ white enameled metal as it most efficiently reflects the heat onto the receptacle and articles therein.

Having described my invention what I claim as new and desire to secure by Letters Patent is:—

1. In a fireless cooker, a heat insulating cover of inverted cup shape, a base plate for said cover, said base plate being provided with a heat conducting portion adapted to be brought into direct contact with heat producing means, means to attach said base plate to said cover portion, and a heat insulating base.

2. A fireless cooker comprising, a heat insulated cover of inverted cup shape, a metallic base plate provided with a heat conducting portion, a conically formed ring on said base plate adapted to seal the junction between said cover and said base plate, means to fasten said cover to said base plate, and a heat insulating base adapted to cover said base plate.

In witness that I claim the foregoing I have hereunto subscribed my name this 1st. day of November, 1907.

PHILIP G. HUBERT.

Witnesses:
 TRIMBLE BARKELEW,
 OLLIE PALMER.